United States Patent [19]

Bohanon

[11] 4,031,180

[45] June 21, 1977

[54] COOLING PAD SYSTEM

[75] Inventor: Hoy R. Bohanon, Muskogee, Okla.

[73] Assignee: Acme Eng. & Mfg. Corporation, Muskogee, Okla.

[22] Filed: June 22, 1976

[21] Appl. No.: 698,737

[52] U.S. Cl. .................................. 261/106; 55/240; 55/495; 55/504; 55/508; 55/DIG. 31; 98/109; 261/112; 261/DIG. 15; 261/DIG. 41

[51] Int. Cl.² ........................................ B01F 3/04

[58] Field of Search ............ 261/97, 103, 106, 110, 261/112, 36 R, DIG. 15, DIG. 41, DIG. 4; 55/240, 242, 495, 504, 508, 229, DIG. 31; 126/113; 98/40 D, 88 S, 100, 109

[56] References Cited

UNITED STATES PATENTS

| | | | |
|---|---|---|---|
| 1,402,147 | 1/1922 | Day | 261/112 X |
| 1,913,885 | 6/1933 | Jordahl | 55/242 X |
| 1,927,593 | 9/1933 | Mohler | 261/103 |
| 2,214,750 | 9/1940 | Myers | 55/504 X |
| 2,450,191 | 9/1948 | Feinberg | 261/97 |
| 2,838,130 | 6/1958 | Lemmon | 261/97 X |
| 2,850,269 | 9/1958 | Bohanon | 261/97 |
| 2,856,166 | 10/1958 | Goettl | 261/97 X |
| 3,262,682 | 7/1966 | Bredberg | 261/112 X |
| 3,322,405 | 5/1967 | Knudson et al. | 261/106 X |
| 3,947,532 | 3/1976 | Skold et al. | 261/112 |

Primary Examiner—Tim R. Miles
Assistant Examiner—Richard L. Chiesa

[57] ABSTRACT

An evaporation cooling system for installation within an opening within the wall of a building and having a water conductor provided with spaced openings in the top thereof, retainers spaced apart from each other and extending along the top of the opening, a plurality of brackets spaced apart from each other, retaining clips secured to the brackets so as to extend across the opening below the retainers, a gutter positioned below the retainers, a plurality of support brackets secured to the gutter, a pan provided with openings therein resting on the support brackets, a plurality of individually distinct cooling cells each having front, rear and side faces, the cells consisting of a first group of cells having their bottom portions resting in abutting relationship against the pan and extending along the pan to form a wall, and the front and rear faces of their top portions confined between the retaining clips and the side faces of their top portions confined between the brackets, and a second group of cells having their bottom portions resting in abutting relationship against the tops of the cells of the first group and the front and rear faces of their bottom portions confined between the retaining clips and the side faces of the bottom portions confined between said brackets, and having their top portions confined between the retainers.

6 Claims, 11 Drawing Figures

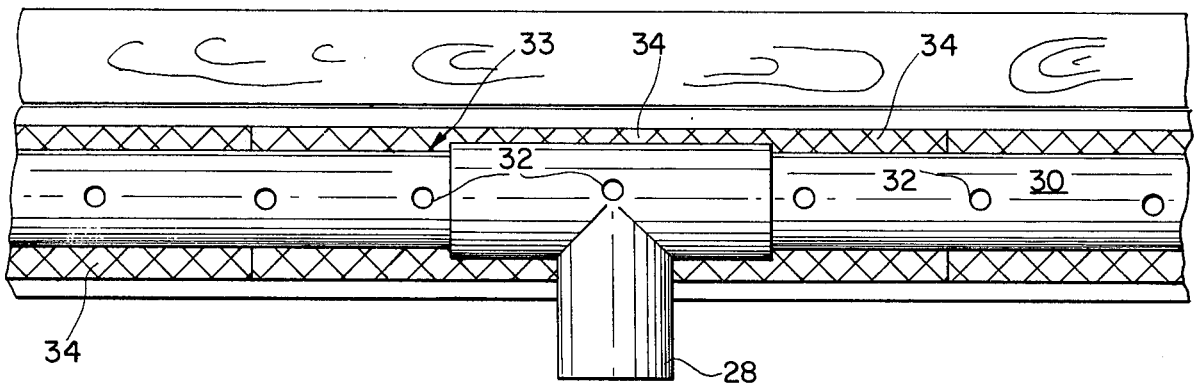
FIG. 3
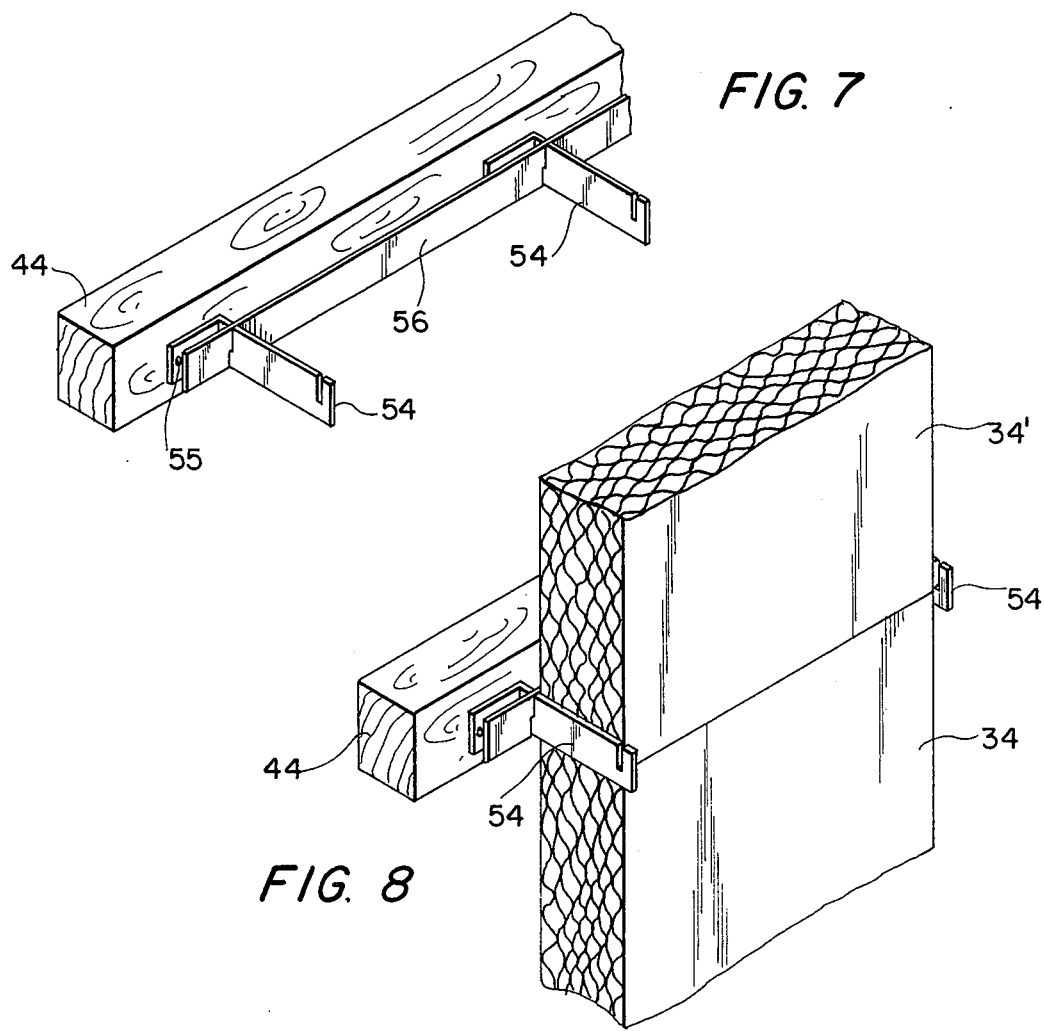
FIG. 7
FIG. 8

COOLING PAD SYSTEM

BACKGROUND AND SUMMARY OF THE INVENTION

The present invention relates to water evaporative cooling systems of the type that are used in greenhouses, poultry houses and livestock installations. Such cooling systems are installed within one or more of the walls of the building and include a water soaked pad. The outside air is cooled as it passes into the building through the water soaked pad because of the vaporization of the water. A pump is employed to supply water at controlled rates to a drip conductor positioned immediately above the pad. The water drips downwardly from the conductor through the pad soaking same during which time exhaust fans installed within the walls of the building create a negative pressure therein causing outside air to pass through the water soaked pad into the building during which time the desired cooling of the incoming air is effected. Excess water is collected below the pad in a return conductor and thereafter pumped back to the drip conductor to continue the cooling operation.

The pads that have been used for many years consist of select-cut, high altitude grown aspen fibers formulated of the desired density, texture and thickness and covered with a plastic netting. Various systems have been used to suspend the aspen fiber pads within the wall of the installation. One such cooling pad hanger system is disclosed in U.S Pat. No. 2,850,269.

The cooling pads may also be constructed of cellulose paper impregnated with insoluble anti-rot salts. Such pad material is designed with a crossfluted configuration which induces a high degree of turbulent mixing of water and air contributing to the evaporative efficiency. Additionally the crossfluted design produces a strong self-supporting pad structure that may be firmly held in place within the wall of the installation.

The crossfluted cellulose paper material is formed as individual cooling "cells." The cells may be stacked one on top of another to achieve the desired height and adjacent to each other to form a continuous pad of desired length. The assembled cells which define the pad are supported at their bases by the return gutter. The system for supporting the individual cells is specifically designed to permit ease in assembly at the installation site, and as well to permit the construction of a pad of the desired length and height.

BRIEF DESCRIPTION OF THE DRAWINGS

FIG. 3 is a sectional view taken along line 3—3 of FIG. 1 illustrating in particular the drip conductor which is located directly above the assembled cooling cells of the pad;

FIG. 7 is a perspective view of a portion of the cooling pad system illustrating in particular two of the angle brackets attached to the intermediate stringer, and one of the retaining clips attached to the brackets so as to be positioned along the intermediate stringer;

FIG. 8 is a perspective view of a portion of the cooling pad system illustrating in particular two cooling cells positioned one above the other and secured between the angle brackets;

DESCRIPTION OF THE PREFERRED EMBODIMENT

Figure 1:
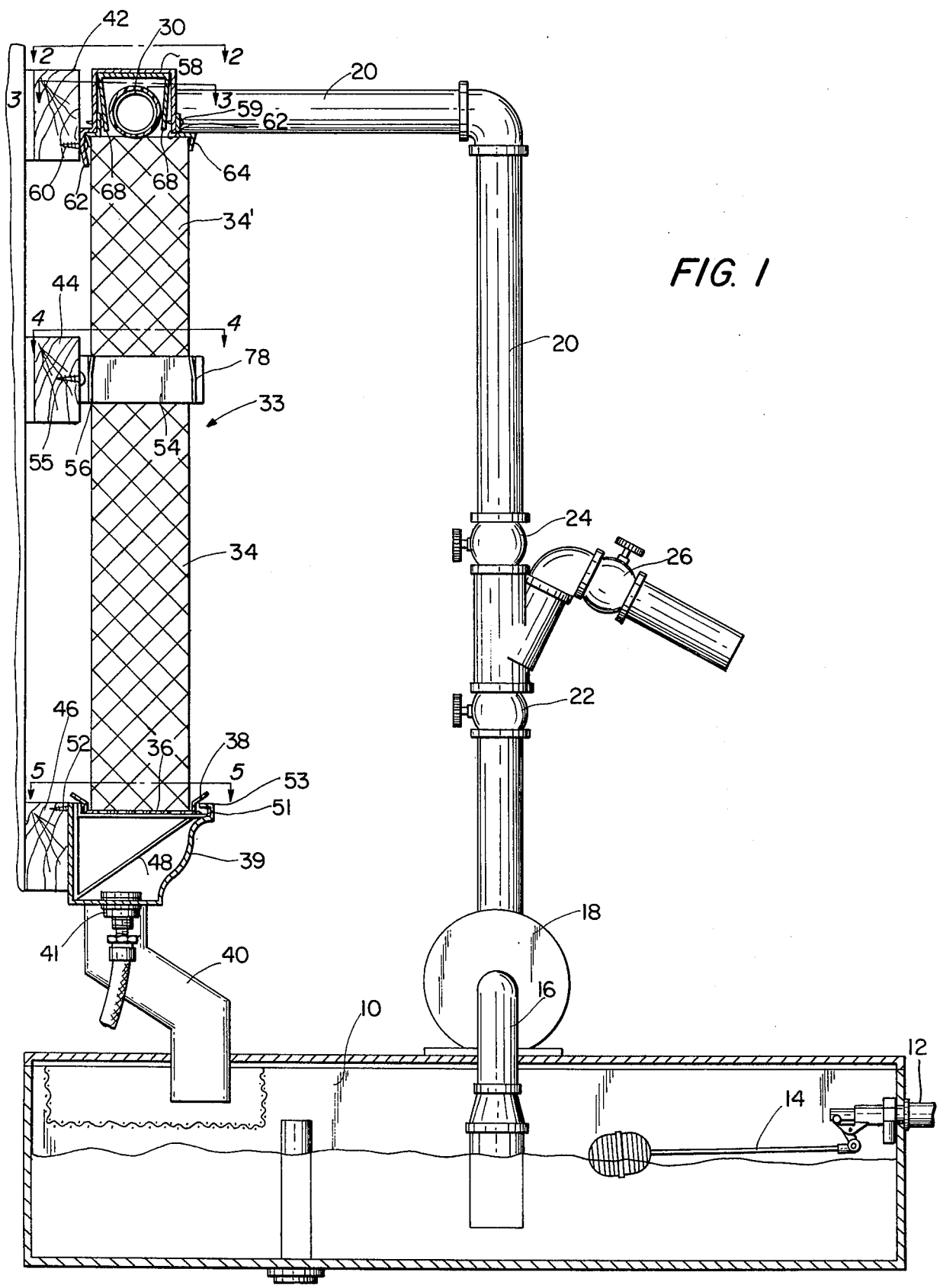
FIG. 1 is a side elevational view partly in section illustrating the cooling pad assembly.

Reference is initially made to FIG. 1 which discloses the entire cooling pad system. It will be apparent that there is provided a sump designated by the reference numeral 10 which is supplied with water through the conduit 12 which is provided with a float valve 14 for the purpose of maintaining a desired level of water in the sump 10. Appropriate conduit structure 16 is employed to place the interior of the sump 10 in fluid communication with the pump 18. Typically, the pump 18 is of the heavy-duty, centrifugal, positive, self-priming type requiring no foot valves and providing for high volume and relatively low head performance characteristics. Within the remaining conduit structure 20 there are provided a flow control valve 22, a shut-off valve 24 and a flush out valve 26. It will also be apparent from FIGS. 1 and 3 that the conduit 20 leads directly to a Tee 28 which is operatively connected to the drip conductor 30 which is provided with a plurality of openings 32 throughout its length. Water is sprayed upwardly through the openings 32 and then passes downwardly into the pad 33 which is defined by the individual cooling cells 34. Excess water from the pad 33 passes downwardly through the openings 36 provided within the drip pan 38 into the gutter 39 and is thereafter returned to the sump 10 through the conduit 40. A bleed off conduit structure designated by the reference numeral 41 is also provided. Outside air is caused to rush inwardly through the water-soaked cells 34 of the pad 33 by the operation of one or more exhaust fans (not illustrated) and is cooled by the induced vaporization of the water. The general organization and the functioning of the components of the cooling system of the present invention now being apparent, the structure for installing the cooling pad assembly within a wall of the installation will now be described.

Figure 5:
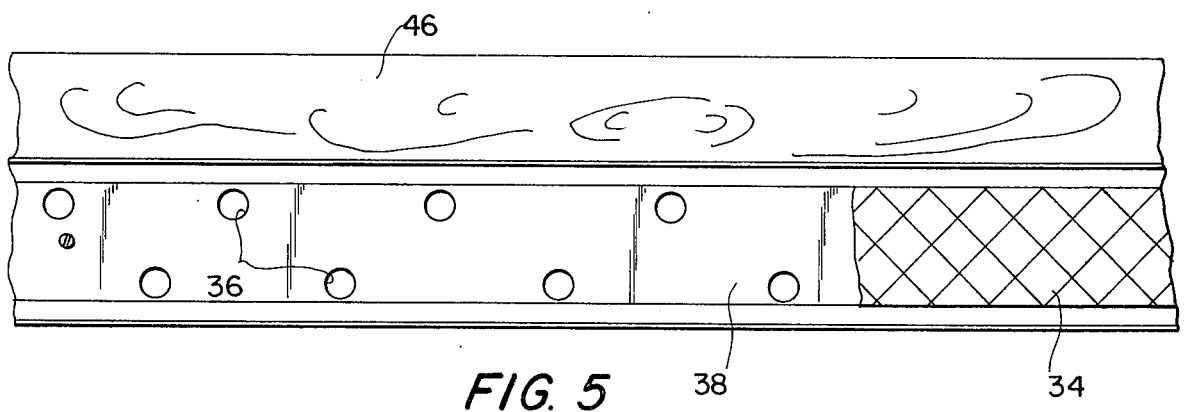
FIG. 5 is a sectional view taken along line 5—5 of FIG. 1 illustrating in particular the drip pan which supports the cooling cells.
Figure 9:
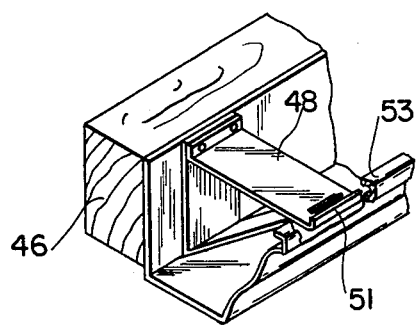
FIG. 9 is a perspective view of one of the support brackets inserted in place within the gutter.
Figure 11:
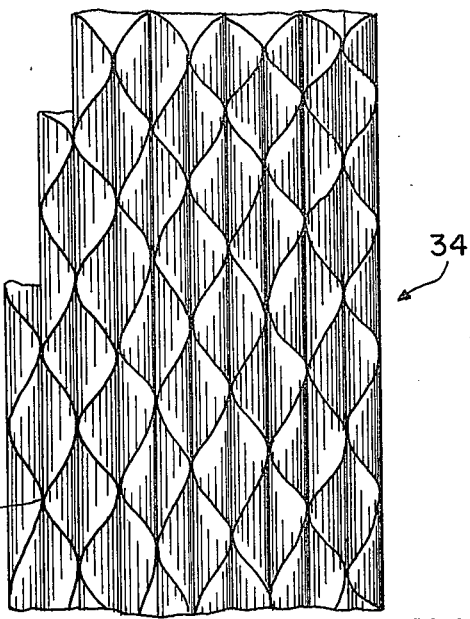
FIG. 11 is a side elevational view of that portion of the cooling cell illustrated in FIG. 10.

Initially, the opening within the wall of the installation is framed with the upper and lower stringers 42 and 46, and the intermediate stringer 44 where it is desired to stack the cells 34 one on top of another, as will be explained hereinafter. Thereafter, support brackets designated by the reference numeral 48 in FIGS. 1 and 9 are inserted within the gutter 39 at predetermined intervals and then the brackets 48 and the gutter 39 are secured to the lower stringer 46 by any fastening means, for example, the screws 52. It will be noted from FIGS. 1 and 9 that the support brackets 48 are provided at the outer portions with curved flanges 51 which fit within the corresponding outer curved flanges 53 of the gutter 39. Thereafter, the drip pan 38 is positioned on top of the support brackets 48 so as to extend along the top of the gutter 39, as illustrated in FIG. 5.

Figure 4:
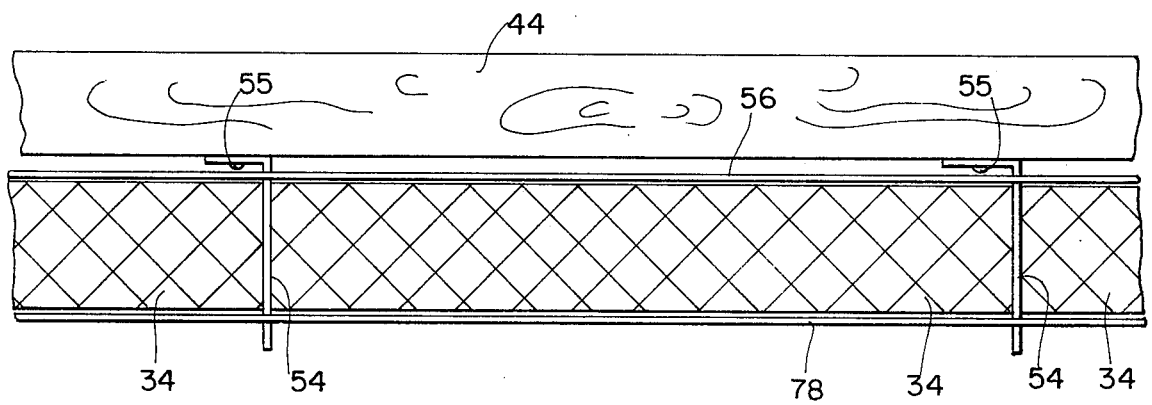
FIG. 4 is a sectional view taken along line 4—4 of FIG. 1 illustrating in particular the angle brackets and retaining clips for assembling the cooling cells.

When it is desired to extend the height of the pad 33 by stacking the cells 34 one on top of another, the intermediate stringer is positioned in place. The none of the cooling cells 34 is positioned such that the bottom thereof rests on the drip pan 38. Then, two of the angle brackets 54 are secured with fasteners 55 to the intermediate stringer 44 on each side of the cell 34, as illustrated in FIGS. 4 and 7. This procedure is repeated until all of the angle brackets 54 necessary to define the desired length of the cooling pad have been fastened to the intermediate stringer 44. Thereafer, the retaining clip 56 is fastened to the angle brackets 54 along the intermediate stringer 44, as illustrated in FIG. 7. At this time, the individual cells 34 may be positioned in place between the angle brackets 54 in abutting relationship against the retaining clip 56.

Figure 6:
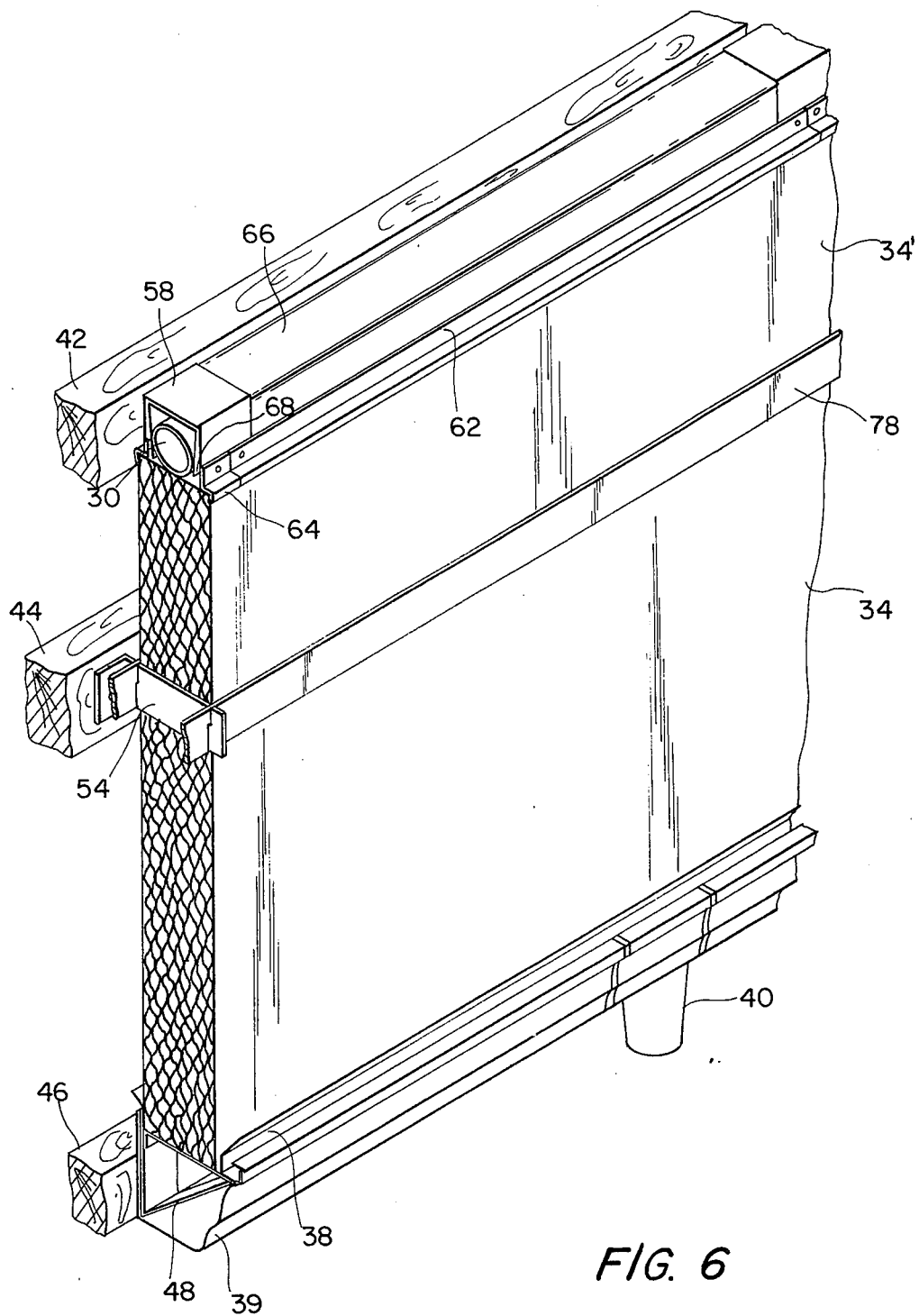
FIG. 6 is a perspective view of a portion of the cooling pad system illustrating in particular the arrangements of the pad cover and brackets, the angle brackets and retaining clips and the gutter, support bracket and drip pan.

At this stage of the installation the height of the pad being assembled is raised by adding an additional row of cells 34' in which case the bottoms of the upper cells 34' are positioned in abutting relationship against the tops of the lower cells 34 in the region of the angle brackets 54, as illustrated in FIGS. 1 and 8. Finally, the retaining clip 78 is slided in place within the angle brackets 54 so as to extend along the wall of the cells 34, as seen in FIG. 6.

Figure 2:
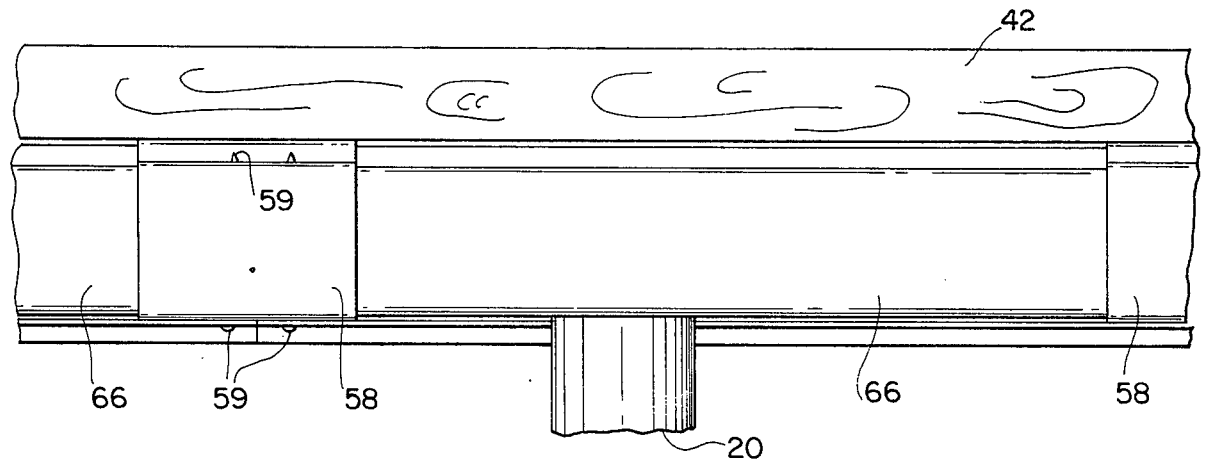
FIG. 2 is a sectional view taken along line 2—2 of FIG. 1 illustrating in particular one of the pad covers mounted to extend between the brackets which are spaced apart from each other.

It is to be understood that where the desired height of the pad can be achieved with a single cell 34, it is not necessary to use the intermediate stringer 44 and the angle brackets 54 and retaining clips 56 and 78. But in either case, the pad cover brackets 58, as illustrated in FIGS. 1 and 2, are then mounted in spaced relationship along the upper stringer 42. The retainers 62 are attached to the brackets 58 with the fasteners 59, and the retainer 62 adjacent the upper stringer is attached to the upper stringer 42 at selected points with the screws 60. The retainers 62 are provided with flanges 64 which support the uppermost portions of the cells 34, 34' throughout the length of the pad assembly.

Thereafter the drip conductor 30 is positioned below the pad cover brackets 58, and appropriate connection made with the Tee section 28. It is to be noted that the metering holes 32 located in both the drip conductor 30 and the Tee section 28 point upwardly such that the water will spray upwardly for proper distribution. Finally, the pad covers designated by the reference numeral 66 are positioned in place between the brackets 58, by squeezing the legs 68 thereof together so as to permit the legs 68 to be fitted within the brackets 58 around the fasteners 60.

Figure 10:
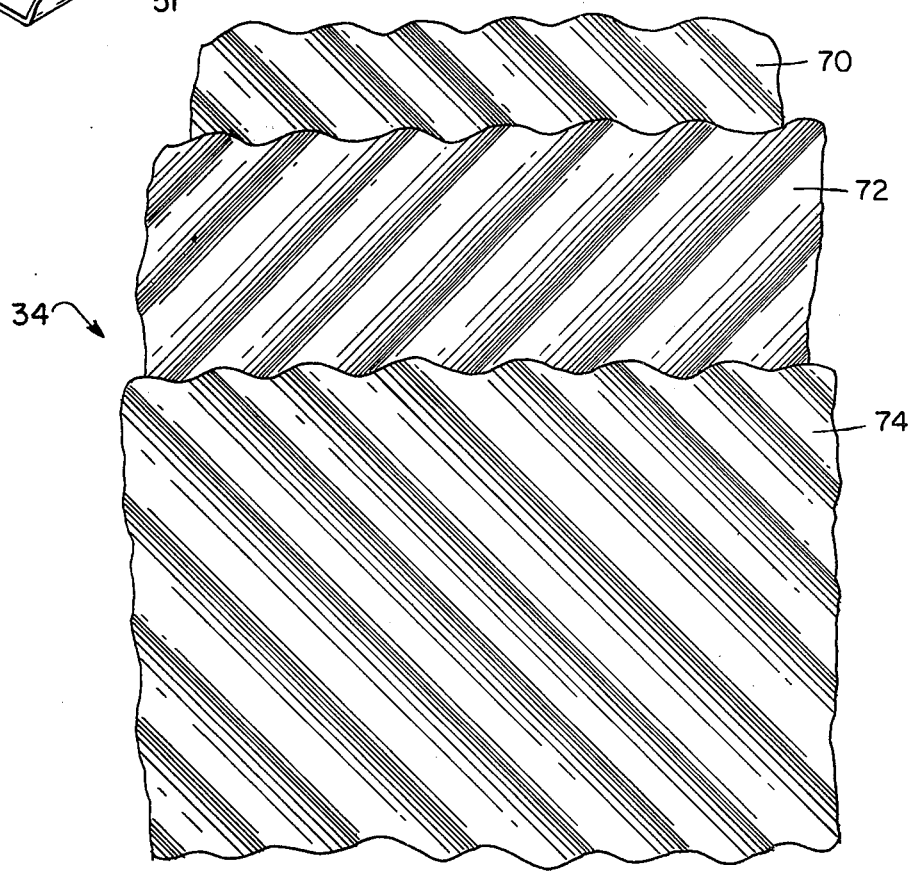
FIG. 10 is a front elevational view of a portion of one of the cooling cells with certain of the layers thereof removed so as to illustrate the crossfluted configuration.

The construction of the cooling cells 34 is illustrated in FIGS. 9 and 10 wherein it is apparent that each cell consists of a plurality of sheets 70, 72, 74, each of which is provided with corrugations 76. The sheets are capable of absorbing water and may be made of fibers of cellulose or inorganic materials such as asbestos, and are imparted with the necessary mechanical strength by being impregnated with suitable substances such as phenolic aldehyde resin. Reference is made to U.S. Pat. No. 3,262,682 wherein there is found a discussion of the construction and characteristics of such cells. The sheets 70, 72, 74 are connected to each other at the junctures of the corresponding corrugations 76 by the resin. It will be apparent that the corrugations of the sheets 70, 72, and 74 are inclined at 45°. In this connection it should be noted that the selection of the angle of inclination of the corrugations 76 is determined on the basis of achieving the highest possible efficiency. It has been found on the basis of extensive experimentation that to achieve maximum cooling of the air with minimum pressure loss the angles of inclination of each sheet should be 45° with the inclination being reversed on adjacent sheets such as is disclosed in FIG. 10.

The cells 34 of which the pad 33 is constructed provide certain advantages over the well-known aspen pads. Substantially less pad area is required to achieve a desired level of cooling when using the cross-fluted cells 34 than when using the conventional aspen fiber pad system. And a pad system constructed of the cross-fluted cells 34 tends to retain its useful life for a significantly longer period of time than a system employing aspen pads, thus reducing labor and material replacement costs. It should also be noted that the system for supporting the individual cells 34 has been designed in such a manner as to permit existing aspen pad systems to be converted for use with the cross-fluted cooling cells 34 with minimal additional accessory parts.

What is claimed is:

1. In an evaporative cooling system including a sump, a water conductor positioned along the top of an opening within a wall of a building and provided with a plurality of openings therealong, a pump for transferring water from the sump to the conductor, a gutter positioned along the bottom of the opening within the wall of the building, and a conduit connecting the gutter to the sump, the improvement comprising a plurality of individually distinct cooling cells, each cell consisting of a plurality of water absorbing sheets having corrugations, the corrugations of adjacent sheets intersecting each other, a plurality of support brackets positioned in spaced relationship along the gutter, a pan resting on said support brackets along the top of said gutter, said pan being provided with a plurality of openings therein, the bottom of said cooling cells resting on said pan, a plurality of pad cover brackets spaced apart from each other immediately above said water conductor and being provided with retainers on each side thereof located on opposite sides of said water conductor and terminating downwardly in flanges that are spaced apart from each other a distance corresponding to the distance between the faces of said cells such that the top portions of said cells are held securely between said flanges, and a plurality of pad covers connected between said pad cover brackets to form a continuous wall above said water conductor.

2. An improved evaporative pad cooling system as in claim 1, including a supporting member between said conductor and gutter and positioned in generally parallel relationship thereto, a plurality of brackets fastened to said supporting member and spaced apart from each other distances corresponding to the width of each of said cells, a first retaining clip secured to said brackets in close proximity to said supporting member, a second retaining clip also secured to said brackets and spaced from said first retaining clip a distance such that portions of the faces of said cells closest to said opening within the wall of the building rest in abutting relationship against said first retaining clip while portions of the opposite faces of said cells rest in abutting relationship against said second retaining clip.

3. A structure for forming an evaporative cooling pad of separate cooling cells, comprising:

a lower stringer, a gutter mounted along said stringer, a plurality of support brackets mounted to said gutter in spaced relationship, and a drip pan having a plurality of openings therein and resting on said support brackets so as to extend along said gutter, an upper stringer spaced above said lower stringer, a plurality of pad cover brackets, a first retainer attached to said pad cover brackets and secured at spaced intervals to said upper stringer, a second retainer attached to said pad cover brackets and extending in parallel relationship to said first retainer, a plurality of individually distinct cooling cells each having front, rear and side faces, the bottom of said cooling cells resting on said pan, said first and second retainers being arranged to permit the uppermost portions of said cells to be fitted therebetween, a pad cover positioned betebeen adjacent of said brackets an intermediate stringer placed above said lower stringer, a plurality of brackets attached to said intermediate stringer and spaced apart from each other a distance corresponding to the width of said cooling cells, a first retaining clip attached to said brackets and extending along said intermediate stringer so as to permit a portion of one side of each of said cells to rest thereagainst, and a second retaining clip attached to said brackets and extending outwardly from said intermediate stringer so as to permit a portion of the other side of each of said cells to rest thereagainst.

4. A structure for forming an evaporative cooling pad as in claim 3, wherein said brackets attached to said intermediate stringer are provided with two slots extending downwardly from the top portions thereof, and said first and second retaining clips are provided with slots extending upwardly from the bottom portions thereof at the points of intersection with said brackets attached to said intermediate stringer permitting said retaining clips to be attached to said brackets attached to said intermediate stringer.

5. A structure for forming an evaporative cooling pad of separate cooling cells as in claim 3, wherein each of said support brackets comprises a first portion abutting said gutter and having a top and bottom, a second portion extending outwardly from said top of said first portion at substantially a right angle and terminating in a flange, and a third portion extending outwardly from said bottom of said first portion and intersecting said second portion, said gutter being provided with a flange against which said flange of said second portion abuts.

6. An evaporative cooling system for installation within an opening within the wall of a building, comprising a water conductor provided with spaced openings in the top thereof, retainers spaced apart from each other and arranged to be supported by the wall so as to extend along the top of the opening, a plurality of brackets positioned below said retainers and spaced apart from each other and arranged to be supported by the wall, retaining clips secured to said brackets so as to extend across the opening below said retainers and spaced apart from each other a distance corresponding to the distance between said retainers, a gutter arranged to be supported by the wall and positioned below said retainers, a plurality of support brackets secured to said gutter, a pan provided with openings therein resting on said support brackets, a plurality of individually distinct cooling cells each having front, rear and side faces, said cells consisting of a first group having their bottom portions resting in abutting relationship against said pan and extending along said pan to form a wall, and having the front and rear faces of their top portions confined between said retaining clips and the side faces of their top portions confined between said brackets, and a second group having their bottom portions resting in abutting relationship against the tops of said cells of said first group and having the front and rear faces of their bottom portions confined between said retaining clips and the side faces of said bottom portions confined between said brackets, and having their top portions confined between said retainers.

* * * * *